United States Patent [19]

Haas et al.

[11] Patent Number: 5,017,623

[45] Date of Patent: May 21, 1991

[54] PROCESS FOR THE PREPARATION OF POLYURETHANE FOAMS

[75] Inventors: Peter Haas, Haan; Hans Hettel, Roesrath; Andreas Ruckes, Leverkusen, all of Fed. Rep. of Germany

[73] Assignee: Bayer Aktiengesellschaft, Bayerwerk, Fed. Rep. of Germany

[21] Appl. No.: 396,481

[22] Filed: Aug. 21, 1989

[30] Foreign Application Priority Data

Sep. 3, 1988 [DE] Fed. Rep. of Germany ....... 3829958

[51] Int. Cl.$^5$ ............................................. C08G 18/14
[52] U.S. Cl. .................................................. 521/128
[58] Field of Search ......................................... 521/128

[56] References Cited

U.S. PATENT DOCUMENTS

| 4,221,875 | 9/1980 | Yukuta et al. | 521/128 |
| 4,258,141 | 3/1981 | Jarre et al. | 521/114 |
| 4,618,667 | 10/1986 | Kay et al. | 528/49 |
| 4,810,729 | 3/1989 | Davis et al. | 521/94 |

FOREIGN PATENT DOCUMENTS

| 1115447 | 10/1961 | Fed. Rep. of Germany . |
| 1506154 | 4/1978 | United Kingdom . |
| 2094315 | 9/1982 | United Kingdom . |
| 2163762 | 3/1986 | United Kingdom . |
| 2177406 | 1/1987 | United Kingdom . |
| 2178745 | 2/1987 | United Kingdom . |

*Primary Examiner*—Maurice J. Welsh
*Attorney, Agent, or Firm*—Joseph C. Gil; Lyndanne M. Whalen

[57] ABSTRACT

This invention relates to a process for the preparation of polyurethane foams comprising reacting polyisocyanates with compounds containing at least two active hydrogen atoms and having a molecular weight of 400 to 10,000 selected from polymer-modified polyols and polyols containing predominantly primary hydroxyl groups, in the presence of water and/or organic blowing agents, catalysts, and flameproofing agents having the formula

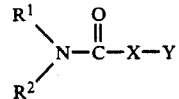

in which
$R^1$ and $R^2$ are independently hydrogen or $C_1$-$C_4$ alkyl;
X is —$(CH_2)_n$— wherein n is an integer of from 0 to 5 (preferably 0 or 1), —CH=CH—, a branched alkylene group, an arylene group, or $(NH)_m$ wherein m is 1 or 2;
Y is —CN or

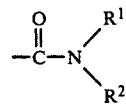

wherein $R^1$ and $R^2$ are as defined above or both $R^2$ together form a bond.

The reaction is optionally carried out in the presence of other flameproofing agents, compounds containing at least two isocyanate-reactive hydrogen atoms and having a molecular weight of 32 to 399, and known surface-active additives and auxiliaries.

14 Claims, No Drawings

PROCESS FOR THE PREPARATION OF POLYURETHANE FOAMS

BACKGROUND OF THE INVENTION

Polyurethane foams with a more flame-resistant finish have long been sought and, because flame resistance requirements are becoming increasingly more stringent, continue to receive attention. As a result, particular attention has recently been paid to British Standard BS 5852, Part 2, for example in the performance of the Crib 5 test. This test imposes particularly stringent demands on the foams in regard to their ignition resistance. In addition to the more stringent flame resistance requirements, restricted use of phosphate esters or haloalkyl phosphate esters as flameproofing agents is being urged.

Another approach to flameproofing polyurethane foams uses melamine as a flameproofing agent. In this regard, see German Offenlegungsschrift 2,809,084, British Patent 2,177,406, German Offenlegungsschrift 2,815,554, German Offenlegungsschrift 3,530,519 and British Patent 2,094,315. However, melamine makes the foams relatively hard, as reflected by a considerable increase in the compression hardness of the foam.

German Offenlegungsschrift 2,533,180 relates to the production of flame-retardant latex or polyurethane foams using aluminum oxide hydrate, other bauxite minerals, and oxamide. Since, oxamide itself does not have a flameproofing effect in conventional polyurethane foams, the self-extinguishing effect cannot be attributed to oxamide.

On the other hand, if these compounds are used in high-resilience (HR) foams, a surprisingly good flameproofing effect is observed. Moreover, if amide-containing compounds having a chain length longer than for oxamide, excellent flameproofing is obtained in both standard foams and high-resilience foam systems.

SUMMARY OF THE INVENTION

The present invention, therefore, relates to a process for the preparation of polyurethane foams comprising reacting
(1) polyisocyanates with
(2) compounds containing at least two active hydrogen atoms and having a molecular weight of 400 to 10,000 selected from polymer-modified polyols and polyols containing predominantly primary hydroxyl groups,
in the presence of
(3) water and/or organic blowing agents,
(4) catalysts, and
(5) flameproofing agents having the formula I

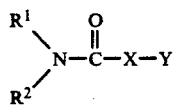

in which
$R^1$ and $R^2$ are independently hydrogen or $C_1$-$C_4$ alkyl;
X is —$(CH_2)_n$— wherein n is an integer of from 0 to 5 (preferably 0 or 1), —CH=CH—, a branched alkylene group, an arylene group, or wherein $(NH)_m$ is 1 or 2;
Y is —CN or

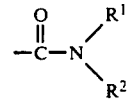

wherein $R^1$ and $R^2$ are as defined above or both $R^2$ together form a bond, and
optionally in the presence of
(6) other flameproofing agents,
(7) compounds containing at least two isocyanate-reactive hydrogen atoms and having a molecular weight of 32 to 399, and
(8) known surface-active additives and other known auxiliaries.

As used herein, the term "branched alkylene group" refers to a $C_2$-$C_8$ branched chain aliphatic hydrocarbon group connecting Y to the carbonyl carbon atom of compounds of formula I. Examples of branched alkylene groups include branched alkylidene groups such as ethylidene, 1-methylethylidene, 1-ethylethylidene, propylidene, 1-methylpropylidene, 1-ethylpropylidene, and the like, and other branched alkylene groups such as methylethylene (i.e., propylene), ethylethylene, 2-methyltrimethylene, 2,2-dimethyltrimethylene, and the like.

As used herein, the term "arylene group" refers to a $C_6$-$C_{15}$ aromatic hydrocarbon group connecting Y to the carbonyl carbon atom of compounds of formula I and optionally includes aromatic groups having one or more ring carbon atoms replaced with an N, O, or S ring atom and optionally also includes aromatic groups having one or more substituents, such as halogen, alkyl, nitro, alkoxycarbonyl, alkanoyl, amide groups, in place of hydrogen atoms. Examples of arylene groups include phenylene, optionally substituted with one or more alkyl groups (such as methyl, ethyl, propyl, and the like), halogen atoms (such as fluorine, chlorine, and bromine), and the like, as well as similar arylene groups derived from naphthalene, pyridine, thiohene, and the like. Preferred arylene groups includes 1,3-an 1,4-phenylene.

DESCRIPTION OF THE INVENTION

Preferred embodiments of the process according to the invention are characterized by the use of
(1) polyurea dispersions in polyethers as the polymer-modified polyols,
(2) alkanolamine adducts of diisocyanates in polyols as the polymer-modified polyols,
(3) grafted polyethers obtained by polymerization of acrylonitrile and/or styrene in polyethers as the polymermodified polyols,

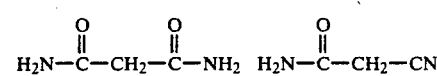

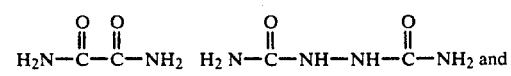

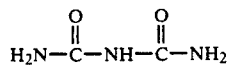

as the flameproofing agents (5), and
(5) other flameproofing agents.

The following starting components are used for the production of the polyurethane foams:

1. Aliphatic, cycloaliphatic, araliphatic, aromatic, and heterocyclic polyisocyanates of the type described, for example, by W. Siefken in *Justus Liebigs Annalen der Chemie*, 562, pages 75 to 136. Suitable such polyisocyanates include those corresponding to the formula $$Q(NCO)_n$$

in which n is an integer of from 2-4 (preferably 2), and

Q is an aliphatic hydrocarbon group containing 2 to about 18 (preferably 6 to 10) carbon atoms, a cycloaliphatic hydrocarbon group containing 4 to about 15 (preferably 5 to 10) carbon atoms, an aromatic hydrocarbon group containing 6 to about 15 (preferably 6 to 13) carbon atoms, or an araliphatic hydrocarbon group containing about 8 to about 15 (preferably 8 to 13) carbon atoms.

Examples of such suitable polyisocyanates include the polyisocyanates described on pages 10–11 of German Offenlegungsschrift 2,832,253.

In general, it is preferred to use the commercially obtainable polyisocyanates, such as 2,4- and 2,6-tolylene diisocyanate and mixtures of these isomers ("TDI"); polyphenyl polymethylene polyisocyanates of the type obtained by phosgenation of aniline-formaldehyde condensates ("crude MDI"); and polyisocyanates containing carbodiimide groups, urethane groups, allophanate groups, isocyanurate groups, urea groups, or biuret groups ("modified polyisocyanates"), particularly those modified polyisocyanates derived from 2,4- and/or 2,6-tolylene diisocyanate and from 4,4'- and/or 2,4'-diphenylmethane diisocyanate.

2. Active-hydrogen starting components include (a) known "polymer-modified" polyols. Preferred polymer-modified polyols include dispersions of (i) polymer-containing, relatively high molecular weight hydroxyl compounds obtained by reaction of mono- and/or polyisocyanates with polyamines containing primary and/or secondary amino groups, hydrazines, hydrazides, or alkanolamines in (ii) a compound containing from 1 to 8 primary and/or secondary hydroxyl groups and having a molecular weight of 400 to 10,000.

Such dispersions of polymer-containing, relatively high molecular weight hydroxyl compounds are described, for example, in German Auslegeschrift 2,519,004, German Offenlegungsschrift 2,550,796, German Offenlegungsschrift 2,550,797, German Offenlegungsschrift 2,550,860, German Offenlegungsschrift 2,550,833, German Offenlegungsschrift 2,550,862, German Offenlegungsschrift 2,638,759, German Offenlegungsschrift 2,639,254, U.S. Pat. No. 4,374,209, European Application 79,115 and U.S. Patent 4,381,351.

It is also possible to use dispersions of reaction products of polyisocyanates (particularly diisocyanates) and alkanolamines in polyethers (for example, German Offenlegungsschrift 3,103,757) and dispersions of homopolymers or copolymers of unsaturated monomers, such as styrene or acrylonitrile, in polyethers (so-called "polymer polyols").

Active-hydrogen starting components can in principle also include only (b) "active" relatively high molecular weight hydroxyl compounds that contain predominantly primary OH groups and which contain no dispersed components of relatively high molecular weight. Such active polyols are known.

3. Water (preferred) and/or readily volatile organic substances are used as blowing agents.

4. The catalysts used in accordance with the invention are those known as such from polyurethane chemistry, such as tertiary amines and organometallic compounds.

5. The above-mentioned compounds corresponding to general formula I are used as flameproofing agents. Suitable such compounds include compounds of the formulas

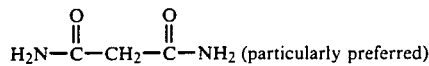 (particularly preferred)

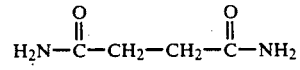

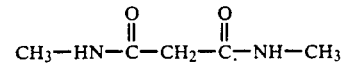

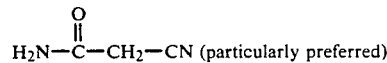 (particularly preferred)

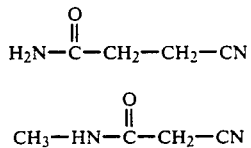

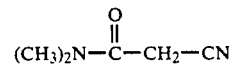

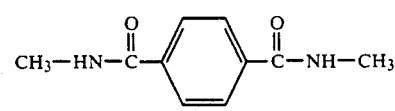

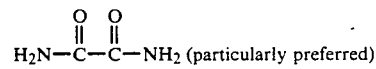 (particularly preferred)

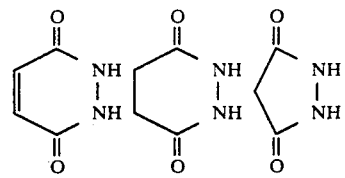

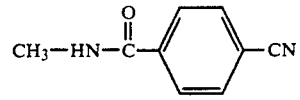

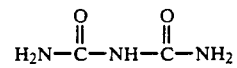

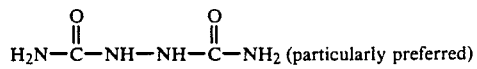 (particularly preferred)

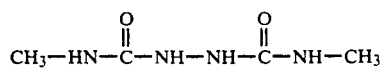

It is, of course, possible to use compound of formula I of the invention as mixtures or in the form of mixtures with known flameproofing agents. Suitable such flameproofing agents include aluminum oxide and aluminum oxide hydrates: halogen-containing phosphoric acid esters, such as tris(chloroethyl) phosphate; and nitrogen-containing flameproofing components, such as melamine, melamine derivatives, and melamine salts (such as melamine oxalate, melamine borate, and melamine cyanurate), cyanamide, and dicyanodiamide.

6. Other suitable starting components include, optionally, compounds containing at least two isocyanate-reactive hydrogen atoms and having a molecular weight in the range from 32 to 399. Such compounds include compounds containing hydroxyl groups, amino groups, thiol groups, or carboxyl groups, preferably compounds containing hydroxyl groups and/or amino groups, which serve as chain-extending or crosslinking agents. These compounds generally contain from 2 to about 8 (preferably from 2 to 4) isocyanate-reactive hydrogen atoms. Examples of such compounds are described in German Offenlegungsschrift 2,832,253 at pages 19-20.

7. Surface-active additives, such as emulsifiers and foam stabilizers, may optionally be used. Preferred emulsifiers are those based on alkoxylated fatty acids and higher alcohols.

Preferred foam stabilizers include polyether siloxanes, particularly water-insoluble types. These compounds generally are a copolymer of ethylene oxide and propylene oxide attached to a polydimethylsiloxane group. Water-soluble foam stabilizers are described, for example, in U.S. Pat. Nos. 2,834,748, 2,917,480, and 3,629,308, but are not suitable for the production of high-resilience (HR) foams.

It is also possible to use reaction retarders, for example, compounds having an acidic nature, such as hydrochloric acid or organic acid halides; known cell regulators, such as paraffins or fatty alcohols or dimethyl polysiloxanes; pigments or dyes; stabilizers against the effects of ageing and weather; plasticizers; fungistatic and bacteriostatic agents; and fillers, such as barium sulfate, kieselguhr, carbon black, or whiting.

Further examples of surface-active additives and foam stabilizers which may optionally be used in accordance with the invention, as well as cell regulators, reaction retarders, stabilizers, flameproofing agents, plasticizers, dyes and fillers, and fungistatic and bacteriostatic agents, and information on the use of these additives and the way in which they work, can be found in Kunststoff-Handbuch, Vol. VII, edited by Vieweg and Höchtlen, Carl-Hanser-Verlag, Munich 1966, for example, on pages 103 to 113.

In the process of the invention, the reaction components are reacted by the known one-shot process, the prepolymer process, or the semiprepolymer process. These processes can often be performed using machines, such as the type described in U.S. Pat. No. 2,764,565. Information on processing machines that may also be used in accordance with the invention can be found in Kunststoff-Handbuch, Vol. VII, edited by Vieweg and Höchtlen, Carl-Hanser-Verlag, Munich 1966, for example, on pages 121 to 205.

When preparing foams according to the invention, the foaming reaction may even be carried out in closed molds by introducing the reaction mixture into a mold. Suitable mold materials include metals, such as aluminum, or plastics, such as epoxy resins. The foamable reaction mixture foams in the mold, thereby forming the molded product. In-mold foaming may be carried out in such a way that the molding has a cellular structure at its surface or in such a way that the molding has a compact skin and a cellular core. In the process of the invention, it is possible to introduce foamable reaction mixture into the mold in such a quantity that the foam formed just fills the mold, but it is also possible to introduce more foamable reaction mixture into the mold than is required to fill the interior of the mold with foam. The latter technique is known as overcharging and is described, for example, in U.S. Pat. Nos. 3,178,490 and 3,182,104.

In in-mold foaming, known "external release agents," such as silicone oils, are often used. However, it is also possible to use so-called "internal release agents," optionally in admixture with external release agents, of the type described, for example, in German Offenlegungsschriften 2,121,670 and 2,307,589.

The foams may, of course, also be produced by known slabstock foaming or laminator processes.

The ignition tests carried out under the stringent requirements of the Crib 5 Test according to BS 5852, Part 2, indicate that the compounds of the invention are eminently suitable as flameproofing agents. The mechanical properties of the resulting foams are also advantageous. For example, hardness is barely affected.

The flame-resistant polyurethane foams are used for the manufacture of furniture and for the production of mattresses which satisfy the more stringent flameproofing standards and safety requirements, for example, according to BS 5852, Part 2, using the ignition sources mentioned therein.

These flame-resistant foams are used for the upholstering of seats in theaters, cinemas, homes, and restaurants and for the upholstering of couches.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all percentages are percentages by weight.

EXAMPLES (A) Malonic acid diamide

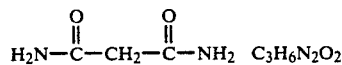

Ammonia is introduced at room temperature into a solution of malonic acid dimethyl ester (1320 g, 10 mole) in 500 ml of methanol kept at 30° C. The crystalline precipitate is collected by suction filtration, washed with methanol, and dried to yield 960 9 of product, m.p. 174° C. (B) Cyanoacetic acid amide

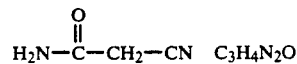

Concentrated aqueous ammonia (1500 g) is added dropwise to cyanoacetic acid methyl ester (990 g, 10 mole) such that the temperature does not exceed 35° C. After stirring for 30 minutes at that temperature, the mixture is cooled to 0° C. The resultant precipitate is collected by suction filtration and recrystallized from ethanol to yield 600 g of product, m.p. 117–120° C.

(C) Oxamide

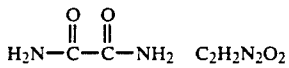  C$_2$H$_2$N$_2$O$_2$

Oxalic acid diethyl ester 1460 g, 10 mole) is introduced into concentrated aqueous ammonia (2000 g), with the temperature rising slowly to 40° C. After stirring for 30 minutes, the mixture is suction filtered and the resultant product is washed thoroughly with water and ethanol and then dried to yield 850 g. The acid value should be below 3.

In the following examples, the constituents are reacted by the process typically used for the preparation of polyurethane foams.

EXAMPLE 1

| | |
|---|---|
| 100 parts | polyurea dispersion based on an active polyether polyol of trimethylolpropane, propylene oxide, and ethylene oxide; a diamine; and tolylene diisocyanate (OH value 32) |
| 30 parts | malonic acid diamide according to (A) |
| 3.0 parts | water |
| 1.0 part | diethanolamine |
| 0.6 part | amine crosslinker based on a higher alkanolamine (crosslinker PU 3229 of Bayer AG, Germany) |
| 0.1 part | amine activator Dabco 33LV (product of Houdry-Huls; solution of triethylenediamine in dipropylene glycol) |
| 0.05 part | bis(2-dimethylaminoethyl) ether (amine activator A1 available from UCC) |
| 0.25 part | stabilizer based on a short-chain polyether-modified silicone (stabilizer AC 3367 of Bayer AG, Germany) |
| 2.0 parts | tris(2-chloroethyl) phosphate |
| 0.15 part | tin octoate |
| 40.6 parts | TDI 80 (mixture of 80% by weight 2,4-tolylene diisocyanate and 20% by weight 2,6-tolylene diisocyanate) |

| Foam properties | |
|---|---|
| Gross density: | 36.5 kg/m$^3$ |
| Tensile strength: | 100 kPa |
| Elongation at break: | 100% |
| Compression hardness (40%): | 3.0 kPa |
| Compression set (90%): | 8.2% |

Flame resistance is tested in accordance with BS 5852, Part 2, Crib 5. Covering: 220 g/m$^2$ PE fabric made by Lister (GB).

| | |
|---|---|
| Total weight: | 1069 g (foam with crib and fabric) |
| Burning time: | 205 seconds |
| Weight loss: | 19 g |
| Height of the foam: remaining intact beneath the crib | 2.5 cm |
| No dripping occurred | |
| Test without fabric: | |
| Total weight: | 931 g (Foam with crib) |
| Burning time: | 160 seconds |
| Weight loss: | 21 g |
| Height of the foam: remaining intact beneath the crib | 1.0 cm |

A conventional foam of the same gross density and containing the same quantity of malonic acid diamide also shows flame-resistant properties. This foam is also self-extinguishing.

EXAMPLE 2

| | |
|---|---|
| 100 parts | polyurea dispersion according to Example 1 |
| 30 parts | cyanoacetic acid amide according to (B) |
| 3.0 parts | water |
| 2.0 parts | diethanolamine |
| 0.6 part | amine crosslinker according to Example 1 |
| 0.1 part | activator Dabco 33LV according to Example 1 |
| 0.05 part | bis(2-dimethylaminoethyl) ether activator according to Example 1 |
| 0.25 part | stabilizer according to Example 1 |
| 0.1 part | tin octoate |
| 40.6 parts | polyisocyanate according to Example 1 |

| Foam properties | |
|---|---|
| Gross density: | 37.4 kg/m$^3$ |
| Tensile strength: | 97 kPa |
| Elongation at break: | 97% |
| Compression hardness: | 4.4 kPa |
| Compression set (90%): | 8.0% |

Flame resistance is tested in accordance with BS 5852, Part 2, Crib 5. Covering: 220 g/m$^2$ PE fabric made by Lister (GB).

| | |
|---|---|
| Total weight: | 1328 g (foam, fabric, crib, holding clips) |
| Burning time: | 180 seconds |
| Weight loss: | 23 g |
| Height of the foam: remaining intact beneath the crib | 1 cm |

EXAMPLE 3

| | |
|---|---|
| 100 parts | polyurea dispersion according to Example 1 |
| 20 parts | cyanoacetic acid amide according to (B) |
| 3.0 parts | water |
| 2.0 parts | diethanolamine |
| 0.6 part | amine crosslinker according to Example 1 |
| 0.1 part | activator Dabco 33LV according to Example 1 |
| 0.05 part | bis(2-dimethylaminoethyl) ether activator according to Example 1 |
| 0.25 part | stabilizer according to Example 1 |
| 0.1 part | tin octoate |
| 40.6 parts | polyisocyanate according to Example 1 |

| Foam properties | |
|---|---|
| Gross density: | 40.7 kg/m$^3$ |
| Tensile strength: | 97 kPa |
| Elongation at break: | 91% |
| Compression hardness: | 4.8 kPa |
| Compression set (90%): | 8.0% |

Flame resistance is tested in accordance with BS 5852, Part 2, Crib 5. Covering: 220 g/m$^2$ PE fabric made by Lister (GB).

| | |
|---|---|
| Total weight: | 1405 g (foam, fabric, crib, holding clips) |
| Burning time: | 184 seconds |
| Weight loss: | 27 g |

EXAMPLE 4

| | |
|---|---|
| 100 parts | polyurea dispersion according to Example 1 |
| 30 parts | hydrazodicarbonamide |
| 3.0 parts | water |
| 1.0 part | diethanolamine |
| 0.6 part | amine crosslinker according to Example 1 |
| 0.25 part | activator Dabco 33LV according to Example 1 |

| 0.05 part | bis(2-dimethylaminoethyl) ether activator according to Example 1 |
| 0.25 part | stabilizer according to Example 1 |
| 0.15 part | tin octoate |
| 2.0 parts | tris(2-chloroethyl) phosphate |
| 40.6 parts | polyisocyanate according to Example 1 |

Foam properties

| Gross density: | 34.9 kg/m³ |
| Tensile strength: | 63 kPa |
| Elongation at break: | 73% |
| Compression hardness: | 3.3 kPa |
| Compression set (90%): | 6.2% |

Flame resistance is tested in accordance with BS 5852, Part 2, Crib 5. Covering: 220 g/m² PE fabric made by Lister (GB).

| Total weight | 1366 g (foam, fabric, crib, holding clips) |
| Burning time | 170 seconds |
| Weight loss | 31 g |
| Height of the foam remaining intact beneath the crib | 15 mm |

EXAMPLE 5

| 100 parts | polyurea dispersion according to Example 1 |
| 20 parts | hydrazodicarbonamide |
| 3.0 parts | water |
| 1.0 part | diethanolamine |
| 0.6 part | amine crosslinker according to Example 1 |
| 0.25 part | activator Dabco 33LV according to Example 1 |
| 0.05 part | bis(2-dimethylaminoethyl) ether activator according to Example 1 |
| 0.25 part | stabilizer according to Example 1 |
| 0.15 part | tin octoate |
| 2.0 parts | tris(2-chloroethyl) phosphate |
| 40.6 parts | polyisocyanate according to Example 1 |

Foam properties

| Gross density: | 33.0 kg/m³ |
| Tensile strength: | 84 kPa |
| Elongation at break: | 98% |
| Compression hardness: | 3.3 kPa |
| Compression set (90%): | 5.3% |

Flame resistance is tested in accordance with BS 5852, Part 2, Crib 5. Covering: 220 g/m² PE fabric made by Lister (GB).

| Total weight: | 1320 g (foam, fabric, crib, holding clips) |
| Burning time: | 135 seconds |
| Weight loss: | 24 g |
| Height of the foam remaining intact beneath the crib | 5 mm |

EXAMPLE 6

| 100 parts | polyurea dispersion according to Example 1 |
| 10 parts | hydrazodicarbonamide |
| 3.0 parts | water |
| 1.0 part | diethanolamine |
| 0.6 part | amine crosslinker according to Example 1 |
| 0.15 part | activator Dabco 33LV according to Example 1 |
| 0.25 part | stabilizer according to Example 1 |
| 0.15 part | tin octoate |
| 2.0 parts | tris(2-chloroethyl) phosphate |
| 40.6 parts | polyisocyanate according to Example 1 |

Foam properties

| Gross density: | 31.2 kg/m³ |
| Tensile strength: | 79 kPa |
| Elongation at break: | 93% |
| Compression hardness: | 3.1 kPa |
| Compression set (90%): | 4.7% |

Flame resistance is tested in accordance with BS 5852, Part 2, Crib 5. Covering: 220 g/m² PE fabric made by Lister (GB).

| Total weight: | 1245 g (foam, fabric, crib, holding clips) |
| Burning time: | 340 seconds |
| Weight loss: | 38 g |

EXAMPLE 7

| 100 parts | polyurea dispersion according to Example 1 |
| 30 parts | oxamide according to (C) |
| 3.0 parts | water |
| 0.6 part | amine crosslinker according to Example 1 |
| 0.1 part | activator Dabco 33LV according to Example 1 |
| 0.15 part | bis(2-dimethylaminoethyl) ether activator according to Example 1 |
| 0.25 part | stabilizer according to Example 1 |
| 0.1 part | tin octoate |
| 2.0 parts | tris(2-chloroethyl) phosphate |
| 40.6 parts | polyisocyanate according to Example 1 |

Foam properties

| Gross density: | 36.1 kg/m³ |
| Tensile strength: | 80 kPa |
| Elongation at break: | 90% |
| Compression hardness: | 4.0 kPa |
| Compression set (90%): | 7.0% |

Flame resistance is tested in accordance with BS 5852, Part 2, Crib 5. Covering: 220 g/m² PE fabric made by Lister (GB).

| Total weight: | 1245 g (foam, fabric, crib, holding clips) |
| Burning time: | 250 seconds |
| Weight loss: | 34 g |

A conventional foam of the same gross density and containing the same quantity of oxamide does not show flame-retardant properties.

What is claimed is:

1. A process for the preparation of polyurethane foams comprising reacting
   (1) a polyisocyanate with
   (2) a compound containing at least two active hydrogen atoms and having a molecular weight of 400 to 10,000 selected from polymer-modified polyols and polyols containing predominantly primary hydroxyl groups,
   in the presence of
   (3) water or an organic blowing agent,
   (4) a catalyst, and
   (5) a flameproofing agent which is a compound other than oxamide or biuret having the formula

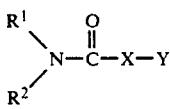

in which

R¹ and R² are independently hydrogen or C₁-C₄ alkyl;

X is —(CH₂)ₙ— wherein n is an interger of from 0 to 5, —CH═CH—, a branched alkylene group, an arylene group, or (NH)ₘ wherein m is 1 or 2; and Y is —CN or

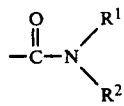

wherein R¹ and R² are as defined above or wherein each R¹ is as defined above and both R² together are a bond.

2. A process according to claim 1 additionally comprising
(6) other flameproofing agents.

3. A process according to claim 1 additionally comprising
(7) a compound containing at least two isocyanate-reactive hydrogen atoms and having a molecular weight of 32 to 399.

4. A process according to claim 1 additionally comprising
(8) known surface-active additives and other known auxiliaries.

5. A process according to claim 1 wherein the polymer-modified polyol is a polyurea dispersion in a polyether.

6. A process according to claim 1 wherein the polymer-modified polyol is an alkanolamine adduct of a diisocyanate in a polyether.

7. A process according to claim 1 wherein the polymer-modified polyol is a grafter polyether obtained by polymerization of acrylonitrile and/or styrene in a polyether.

8. A process according to claim 1 wherein the flameproofing agent (5) is selected from the group consisting of

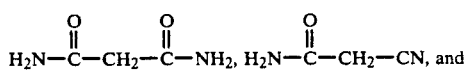

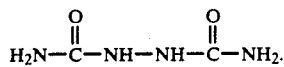

9. A process according to claim 7 wherein said flameproofing agent is used in combination with other flameproofing agents.

10. A process according to claim 1 for the preparation of polyurethane foams comprising reacting
(1) a polyisocyanate with
(2) a compound containing a least two active hydrogen atoms and having a molecular weight of 400 to 10,000 selected from a polyurea dispersion in a polyether, an alkanolamine adduct of a diisocyanate in a polyether, and a grafted polyether obtained by polymerization of acrylonitrile and/or styrene in a polyether,
in the presence of
(3) water or an organic blowing agent,
(4) a catalyst, and
(5) a flameproofing agent selected from the group consisting of

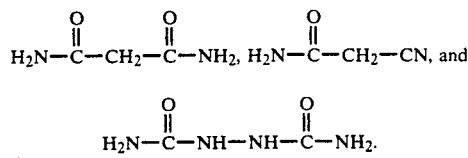

11. A process according to claim 1 for the preparation of polyurethane foams comprising reacting
(1) a polyisocyanate with
(2) a compound containing at least two active hydrogen atoms and having a molecular weight of 400 to 10,000 selected from a polyurea dispersion in a polyether, an alkanolamine adduct of a diisocyanate in a polyether, and a grafter polyether obtained by polymerization of acrylonitrile and/or styrene in a polyether,
in the presence of
(3) water or an organic blowing agent,
(4) a catalyst,
(5) a flameproofing agent selected from the group consisting of

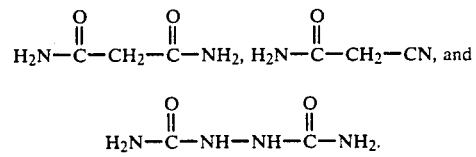

(6) other flameproofing agents,
(7) a compound containing at least two isocyanate-reactive hydrogen atoms and having a molecular weight of 32 to 399, and
(8) known surface-active additives and other known auxiliaries.

12. A process according to claim 1 wherein n is 0 or 1.

13. A process according to claim 1 for the preparation of polyurethane foams comprising reacting
(1) a polyisocyanate with
(2) a compound containing at least two active hydrogen atoms and having molecular weight of 400 to 10,000 selected from polymer-modified polyols and polyols containing predominantly primary hydroxyl groups,
in the presence of
(3) water or an organic blowing agent,
(4) a catalyst,
(5) a flameproofing agent which is a compound other than oxamide or biuret having the formula

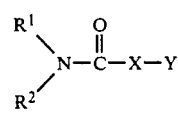

in which $R^1$ and $R^2$ are independently hydrogen or $C_1$-$C_4$ alkyl;

X is —$(CH_2)_n$— wherein n is an integer of from 0 to 5, —CH=CH—, a branched alkylene group, an arylene group, or $(NH)_m$ wherein m is 1 or 2; and Y is —CH or

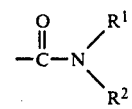

wherein $R^1$ and $R^2$ are as define above or wherein each $R^1$ is as defined above and both $R^2$ together are a bond, (6) other flameproofing agents,
(7) a compound containing at least two isocyanate-reactive hydrogen atoms and having a molecular weight of 32 to 399, and
(8) known surface-active additives and other known auxiliaries.

14. A process according to claim 13 where n is 0 or 1.

* * * * *